(12) United States Patent
Wagner

(10) Patent No.: US 7,500,490 B2
(45) Date of Patent: Mar. 10, 2009

(54) ROTARY VALVE WITH INTERNAL LEAK CONTROL SYSTEM

(75) Inventor: Glenn Paul Wagner, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 708 days.

(21) Appl. No.: 11/197,859

(22) Filed: Aug. 5, 2005

(65) Prior Publication Data

US 2007/0028971 A1   Feb. 8, 2007

(51) Int. Cl.
 *F16K 11/074* (2006.01)
 *B01D 53/047* (2006.01)

(52) U.S. Cl. ............ 137/312; 137/625.46; 137/625.15; 95/96; 95/130; 95/138; 96/124; 96/130; 96/133

(58) Field of Classification Search ............... 137/312, 137/625.15, 625.46; 95/96, 130, 138; 96/124, 96/130, 133
See application file for complete search history.

(56) References Cited

U.S. PATENT DOCUMENTS

| | | | | |
|---|---|---|---|---|
| 3,144,035 A | * | 8/1964 | Marsbed et al. | ............. 137/312 |
| 4,569,371 A | * | 2/1986 | Dolejs et al. | ............ 137/625.47 |
| 4,574,840 A | * | 3/1986 | Schumann et al. | ...... 137/625.15 |
| 4,614,204 A | * | 9/1986 | Dolejs | ................... 137/625.11 |
| 4,614,205 A | * | 9/1986 | Oroskar | .................. 137/625.11 |
| 4,632,149 A | * | 12/1986 | Oroskar et al. | .......... 137/625.15 |
| 4,633,904 A | * | 1/1987 | Schumann et al. | ...... 137/625.15 |
| 5,584,322 A | | 12/1996 | Poschl et al. | |
| 5,807,423 A | | 9/1998 | Lemcoff et al. | |
| 5,820,656 A | | 10/1998 | Lemcoff et al. | |
| 6,311,719 B1 | | 11/2001 | Hill et al. | |
| 6,457,485 B2 | | 10/2002 | Hill et al. | |
| 6,471,744 B1 | * | 10/2002 | Hill | .............................. 96/130 |
| 6,712,087 B2 | * | 3/2004 | Hill et al. | ................ 137/625.46 |
| 6,936,091 B2 | * | 8/2005 | Bayreuther | ................... 96/130 |
| 2002/0124885 A1 | | 9/2002 | Hill et al. | |
| 2005/0056149 A1 | | 3/2005 | Bayreuther | |

\* cited by examiner

*Primary Examiner*—John Rivell
(74) *Attorney, Agent, or Firm*—John Fernbacher; Anne B. Kiernan

(57) ABSTRACT

Rotary valve comprising (a) a rotor having a rotor face rotatable about an axis perpendicular to the rotor face, a plurality of openings, and at least one passage connecting at least one pair of the plurality of openings; (b) a stator having a stator face in sealing contact with the rotor face to form a planar rotary valve seal with an outer periphery, a plurality of openings in the stator face that are connected to respective passages through the stator, and wherein at least one of the passages through the stator is a stator vacuum passage directly connected to a vacuum pump; (c) a sealed valve chamber having an interior volume contiguous with the outer periphery of the rotary valve seal, which chamber is sealed from the atmosphere surrounding the rotary valve; and (d) a vacuum vent passage connected to the sealed valve chamber.

36 Claims, 5 Drawing Sheets

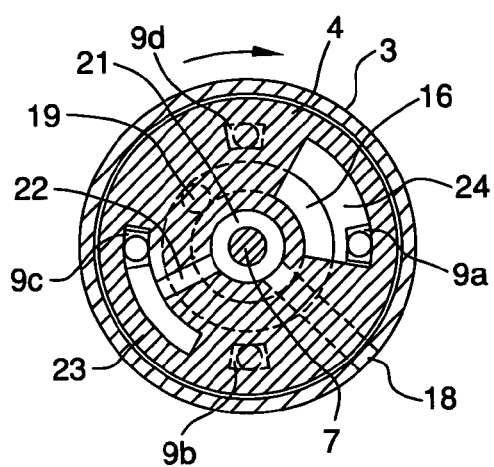
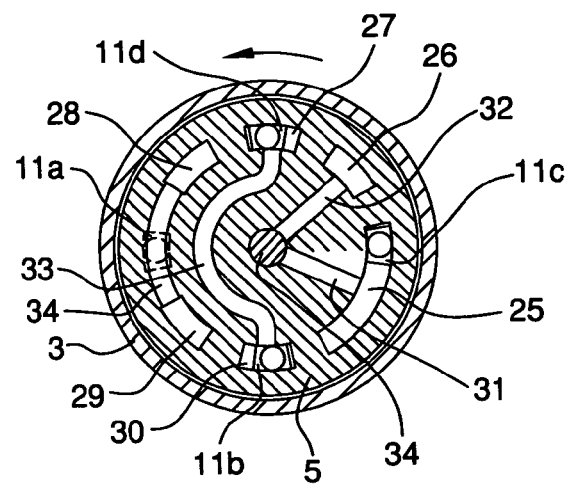
FIG. 6A
FIG. 6B
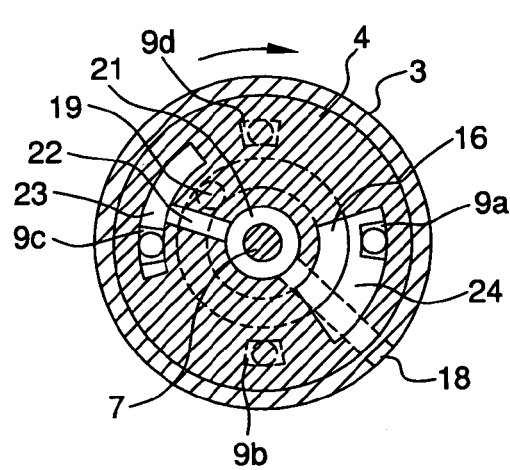
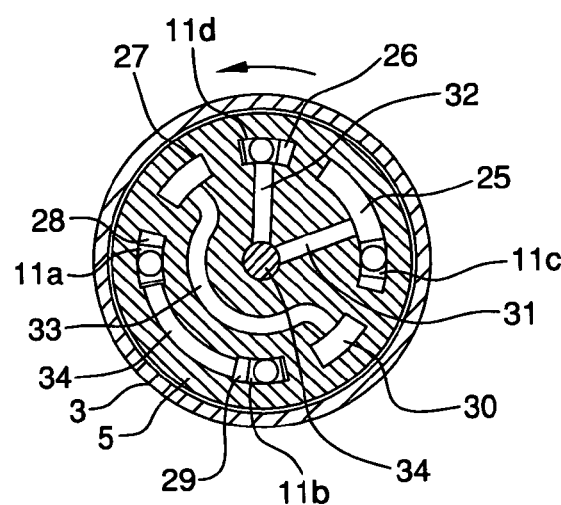
FIG. 7A
FIG. 7B

ROTARY VALVE WITH INTERNAL LEAK CONTROL SYSTEM

BACKGROUND OF THE INVENTION

Rotary valves are widely used in the process industries for directing fluids from one or more process sources to one or more process destinations in repeatable cyclic process steps. These valves, also called rotary sequencing valves, are used in cyclic or repeatable processes such as gas separation by pressure or temperature swing adsorption, liquid separation by concentration swing adsorption, gas or liquid chromatography, regenerative catalytic processes, pneumatic or hydraulic sequential control systems, and other cyclic processes. A widely-used type of rotary valve has a planar circular configuration in which a flat ported rotor rotates coaxially on a flat ported stator such that ports in the stator and rotor are aligned or blocked in a predetermined cyclic sequence. Sealing typically is provided by direct contact of the flat rotor face sliding over the flat stator face. A high degree of precision is required in the fabrication of these flat surfaces to prevent excessive leakage at the mating surfaces. Rigid materials such as metal, carbon, or ceramic typically are used for rotors and stators, but wear of the parts or distortions caused by temperature differentials may cause changes in the shape of the surfaces, thereby allowing leakage across the seal formed between the surfaces.

Rotary valves with a flat rotating circular seal configuration are particularly useful in pressure swing adsorption (PSA) systems utilizing multiple parallel adsorber beds operating in overlapping cyclic steps which include feed, pressure equalization, depressurization, purge, and repressurization steps. In a typical application, a stator having multiple ports is used to connect feed gas and waste gas lines with the feed ends of a plurality of adsorber beds and also to connect the product ends of the beds with a product line and to connect the product ends of pairs of beds for pressure equalization. A rotor having multiple ports sealably rotates on the stator such that the openings on the stator face register sequentially with openings in the rotor face as the rotor rotates to direct gas flow for the desired PSA process cycle steps.

In a typical PSA cycle, the internal passages of the rotary valve are at different pressures as the PSA cycle proceeds. If there is leakage between ports at different pressures, cross-contamination may occur, which in turn can reduce PSA performance parameters such as product purity and product recovery. Internal leakage among valve ports connected to the product ends of the beds is undesirable, because contaminants in the product ends of the beds can affect product purity. When the PSA cycle includes regeneration and purge steps under vacuum, the pressure differentials across the valve sealing face, particularly between rotor and stator ports connecting the feed and product ends of the beds, may lead to various operating problems if leaks occur between these ports.

These problems are addressed by embodiments of the present invention described below and defined by the claims that follow, wherein improved rotary valve configurations are disclosed that reduce the effects of intra-valve leakage on PSA performance.

BRIEF SUMMARY OF THE INVENTION

An embodiment of the invention relates to a rotary valve comprising
(a) a rotor having a rotor face rotatable about an axis perpendicular to the rotor face, wherein the rotor face has a plurality of openings, and wherein the rotor includes at least one passage connecting at least one pair of the plurality of openings;
(b) a stator having a stator face in sealing contact with the rotor face to form a planar rotary valve seal having an outer periphery, wherein the stator face has a plurality of openings in which at least two openings are adapted to register sequentially with openings in the rotor face as the rotor rotates, wherein each opening in the stator face is connected to a respective passage through the stator, and wherein at least one of the passages through the stator is a stator vacuum passage directly connected to a vacuum pump;
(c) a sealed valve chamber having an interior volume contiguous with the outer periphery of the rotary valve seal, which chamber is sealed from the atmosphere surrounding the rotary valve; and
(d) a vacuum vent passage connected to the sealed valve chamber.

The vacuum vent passage may be disposed in the stator to connect the interior volume of the sealed valve chamber with the stator vacuum passage. The sealed valve chamber may be enclosed in part by an outer wall and the vacuum vent passage may be disposed in and pass through the outer wall. The vacuum vent passage may be connected to the vacuum pump. The rotor may have an arcuate vacuum groove that registers continuously with the stator vacuum passage wherein the vacuum vent passage is disposed in the rotor and connects the arcuate vacuum groove with the interior volume of the sealed valve chamber. The sealed valve chamber may be formed in part by a portion of the stator adapted to surround the rotor.

The rotary valve may further comprise a rotatable drive shaft adapted to drive the rotor. The drive shaft typically passes coaxially through the stator and may be rotatably sealed by a shaft seal in contact with the shaft and the stator.

The rotary valve of this embodiment may further comprise
(e) an additional rotor having a rotor face rotatable about an axis perpendicular to the rotor face, wherein the rotor face of the additional rotor has a plurality of openings, and wherein the additional rotor includes at least one passage connecting at least one pair of the plurality of openings; and
(f) an additional stator having a stator face in sealing contact with the rotor face of (e) to form an additional planar rotary valve seal having an outer periphery, wherein the stator face has a plurality of openings in which at least two openings are adapted to register sequentially with openings in the rotor face of (e) as the additional rotor rotates, wherein each opening in the stator face is connected to a respective passage through the stator, and wherein the additional rotor and additional stator are disposed coaxially with the rotor of (a) and the stator of (b);

wherein the outer periphery of the additional planar rotary valve seal is contiguous with the sealed valve chamber.

The vacuum vent passage may be disposed in the stator of (b) and may connect the interior volume of the sealed valve chamber with the stator vacuum passage of (b). The sealed valve chamber may be enclosed in part by an outer wall and the vacuum vent passage may be disposed in and pass through the outer wall. The vacuum vent passage may be connected to the vacuum pump. The rotor of (a) may have an arcuate vacuum groove that registers continuously with the stator vacuum passage and the vacuum vent passage may be disposed in the rotor to connect the arcuate vacuum groove with the interior volume of the sealed valve chamber.

The sealed valve chamber may be formed in part by an axial circumferential extension of the stator of (b), an axial circumferential extension of the additional stator of (f), or axial circumferential extensions of the stator of (b) and the additional stator of (f). The sealed valve chamber may be formed by an axial circumferential extension of the stator of (b) extending axially around the rotor of (a) and the additional rotor of (e), and the axial circumferential extension the stator of (b) may be in sealable contact with the additional stator of (f).

The sealed valve chamber may be formed by an axial circumferential extension of the additional stator of (f) extending axially around the rotor of (a) and the additional rotor of (e), and the axial circumferential extension of the additional stator of (f) may be in sealable contact with the stator of (b).

The rotary valve may further comprising a rotatable drive shaft adapted to drive the rotor. The drive shaft may pass coaxially through either of the stator of (b) or the additional stator of (f) and may be rotatably sealed by a shaft seal in contact with the shaft and the stator of (b) or the additional stator of (f), respectively.

Another embodiment of the invention relates to a rotary valve comprising:
- (a) a first rotor having a rotor face rotatable about an axis perpendicular to the rotor face, wherein the rotor face has a plurality of openings, and wherein the first rotor includes at least one passage connecting at least one pair of the plurality of openings;
- (b) a first stator having a stator face in sealing contact with the rotor face of the first rotor to form a first planar rotary valve seal having an outer periphery, wherein the stator face of the first stator has a plurality of openings in which at least two openings are adapted to register sequentially with openings in the rotor face of the first rotor as the first rotor rotates, wherein each opening in the stator face of the first stator is connected to a respective passage through the first stator;
- (c) a second rotor having a rotor face rotatable about an axis perpendicular to the rotor face, wherein the rotor face of the second rotor has a plurality of openings, and wherein the second rotor includes at least one passage connecting at least one pair of the plurality of openings; and
- (d) a second stator having a stator face in sealing contact with the rotor face of the second rotor to form a second planar rotary valve seal having an outer periphery, wherein the second stator face has a plurality of openings in which at least two openings are adapted to register sequentially with openings in the second rotor face as the second rotor rotates, wherein each opening in the stator face of the second stator is connected to a respective passage through the second stator, and wherein the second rotor and second stator are disposed coaxially with the first rotor and first stator;
- (e) a sealed valve chamber having an interior volume contiguous with the outer periphery of the first planar rotary valve seal and the outer periphery of the second planar rotary valve seal, which chamber is sealed from the atmosphere surrounding the rotary valve; and
- (f) a vacuum vent passage connected to the sealed valve chamber.

At least one of the passages through the first stator may be a stator vacuum passage directly connected to a vacuum pump wherein the vacuum vent passage may be disposed in the first stator to connect the interior volume of the sealed valve chamber with the stator vacuum passage in the first stator. The sealed valve chamber may be enclosed in part by an outer wall and the vacuum vent passage may be disposed in and pass through the outer wall. The vacuum vent passage may be connected to the vacuum pump.

The first rotor may have an arcuate vacuum groove that registers continuously with the stator vacuum passage connected to a vacuum pump, wherein the vacuum vent passage is disposed in the first rotor and connects the arcuate vacuum groove with the interior volume of the sealed valve chamber. The sealed valve chamber may be formed in part by an axial circumferential extension of the first stator, an axial circumferential extension of the second stator, or axial circumferential extensions of the first and second stators. The sealed valve chamber may be formed by an axial circumferential extension of the first stator extending axially around the first and second rotors, wherein the axial circumferential extension the first stator is in sealable contact with the second stator.

The sealed valve chamber may be formed by an axial circumferential extension of the second stator extending axially around the first and second rotors, wherein the axial circumferential extension of the second stator is in sealable contact with the first stator. The rotary valve may further comprise a rotatable drive shaft adapted to drive the first and second rotors. The drive shaft may pass coaxially through either the first stator or the second stator and may be rotatably sealed by a shaft seal in contact with the shaft and the first stator or the second stator, respectively.

An alternative embodiment of the invention relates to a rotary valve comprising:
- (a) a rotor having a rotor face rotatable about an axis perpendicular to the rotor face, wherein the rotor face has a plurality of openings, and wherein the rotor includes at least one passage connecting at least one pair of the plurality of openings;
- (b) a stator having a stator face in sealing contact with the rotor face to form a planar rotary valve seal having an outer periphery, wherein the stator face has a plurality of openings in which at least two openings are adapted to register sequentially with openings in the rotor face as the rotor rotates, wherein each opening in the stator face is connected to a respective passage through the stator;
- (c) a sealed valve chamber having an interior volume contiguous with the outer periphery of the rotary valve seal and a wall separating the interior volume from the ambient atmosphere; and
- (d) a vacuum vent passage connected to the sealed valve chamber;

wherein none of the passages through the stator discharges into the interior volume of the sealed valve chamber.

The vacuum vent passage may be disposed in and pass through the wall of the sealed valve chamber; the vacuum vent passage may be connected to a vacuum pump. The rotor may have an arcuate vacuum groove that registers continuously with a stator vacuum passage connected to a vacuum pump, wherein the vacuum vent passage is disposed in the rotor and connects the arcuate vacuum groove with the interior volume of the sealed valve chamber.

Another alternative embodiment of the invention includes a method of operating a rotary valve comprising
- (a) providing a rotary valve comprising:
  - (1) a rotor having a rotor face rotatable about an axis perpendicular to the rotor face, wherein the rotor face has a plurality of openings, and wherein the rotor includes at least one passage connecting at least one pair of the plurality of openings;
  - (2) a stator having a stator face in sealing contact with the rotor face to form a planar rotary valve seal having an outer periphery, wherein the stator face has a plurality of openings in which at least two openings are adapted to register sequentially with openings in the rotor face as the rotor rotates, wherein each opening in the stator face is connected to a respective passage through the stator, and wherein at least one of the passages through the stator is a stator vacuum passage directly connected to a vacuum pump;

(3) a sealed valve chamber having an interior volume contiguous with the outer periphery of the rotary valve seal; and (4) a vacuum vent passage connected to the sealed valve chamber; and (b) rotating the rotor in sealing contact with the stator and maintaining the pressure in the interior volume of the sealed valve chamber at a value essentially equal to or less than the lowest pressure in any of the passages through the stator.

A related embodiment of the invention includes a method of operating a rotary valve comprising (a) providing a rotary valve comprising (1) a rotor having a rotor face rotatable about an axis perpendicular to the rotor face, wherein the rotor face has a plurality of openings, and wherein the rotor includes at least one passage connecting at least one pair of the plurality of openings;

(2) a stator having a stator face in sealing contact with the rotor face to form a planar rotary valve seal having an outer periphery, wherein the stator face has a plurality of openings in which at least two openings are adapted to register sequentially with openings in the rotor face as the rotor rotates, wherein each opening in the stator face is connected to a respective passage through the stator;

(3) a sealed valve chamber having an interior volume contiguous with the outer periphery of the rotary valve seal and a wall separating the interior volume from the ambient atmosphere; and (4) a vacuum vent passage connected to the sealed valve chamber;

wherein none of the passages through the stator discharges into the interior volume of the sealed valve chamber; and (b) rotating the rotor in sealing contact with the stator and maintaining the pressure in the interior volume of the sealed valve chamber at a value essentially equal to or less than the lowest pressure in any of the passages through the stator.

Another related embodiment of the invention relates to a method of operating a rotary valve comprising (a) providing rotary valve comprising (1) a first rotor having a rotor face rotatable about an axis perpendicular to the rotor face, wherein the rotor face has a plurality of openings, and wherein the first rotor includes at least one passage connecting at least one pair of the plurality of openings;

(2) a first stator having a stator face in sealing contact with the rotor face of the first rotor to form a first planar rotary valve seal having an outer periphery, wherein the stator face of the first stator has a plurality of openings in which at least two openings are adapted to register sequentially with openings in the rotor face of the first rotor as the first rotor rotates, wherein each opening in the stator face of the first stator is connected to a respective passage through the first stator;

(3) a second rotor having a rotor face rotatable about an axis perpendicular to the rotor face, wherein the rotor face of the second rotor has a plurality of openings, and wherein the second rotor includes at least one passage connecting at least one pair of the plurality of openings; and (4) a second stator having a stator face in sealing contact with the rotor face of the second rotor to form a second planar rotary valve seal having an outer periphery, wherein the second stator face has a plurality of openings adapted to register sequentially with openings in the second rotor face as the second rotor rotates, wherein each opening in the stator face of the second stator is connected to a respective passage through the second stator, and wherein the second rotor and second stator are disposed coaxially with the first rotor and first stator;

(5) a sealed valve chamber having an interior volume contiguous with the outer periphery of the first planar rotary valve seal and the outer periphery of the second planar rotary valve seal; and (6) a vacuum vent passage connected to the sealed valve chamber; and (b) rotating the first and second rotors in sealing contact with the first and second stators, respectively, and maintaining the pressure in the interior volume of the sealed valve chamber at a value essentially equal to or less than the lowest pressure in any of the passages through the first stator and the second stator.

A final embodiment of the invention relates to a method of operating a vacuum swing adsorption system comprising (a) providing a vacuum swing adsorption system including (1) a plurality of adsorber vessels, each vessel containing adsorbent material and having a feed inlet and a product outlet;

(2) a vacuum pump having an inlet and an outlet;

(3) a rotary valve comprising (3a) a rotor having a rotor face rotatable about an axis perpendicular to the rotor face, wherein the rotor face has a plurality of openings, and wherein the rotor includes at least one passage connecting at least one pair of the plurality of openings;

(3b) a stator having a stator face in sealing contact with the rotor face to form a planar rotary valve seal having an outer periphery, wherein the stator face has a plurality of openings in which at least two openings are adapted to register sequentially with openings in the rotor face as the rotor rotates, wherein each opening in the stator face is connected to a respective passage through the stator;

(3c) a sealed valve chamber having an interior volume contiguous with the outer periphery of the rotary valve seal and a wall separating the interior volume from the ambient atmosphere; and (3d) a vacuum vent passage in flow communication with the sealed valve chamber and with the inlet of the vacuum pump;

wherein one of the passages through the stator is connected to the feed inlet of one of the plurality of adsorber vessels and another of the passages through the stator is in flow communication with the inlet of the vacuum pump; and (b) introducing a feed gas mixture into the vacuum swing adsorption system and operating each adsorber vessel in sequential steps including at least feed/make product at a super-atmospheric pressure, evacuation to a selected sub-atmospheric pressure, and repressurization to the super-atmospheric pressure;

wherein during the sequential steps of (b) the pressure in the sealed valve chamber is maintained at a pressure equal to or less than the selected sub-atmospheric pressure.

BRIEF DESCRIPTION OF SEVERAL VIEWS OF THE DRAWINGS

FIG. 6A is a modified view of FIG. 4 showing another position of the feed rotor relative to the feed stator.

FIG. 6B is a modified view of FIG. 5 showing another position of the product rotor relative to the product stator.

FIG. 7A is a modified view of FIG. 6A showing another position of the feed rotor relative to the feed stator.

FIG. 7B is a modified view of FIG. 6B showing another position of the product rotor relative to the product stator.

DETAILED DESCRIPTION OF THE INVENTION

Figure 1:
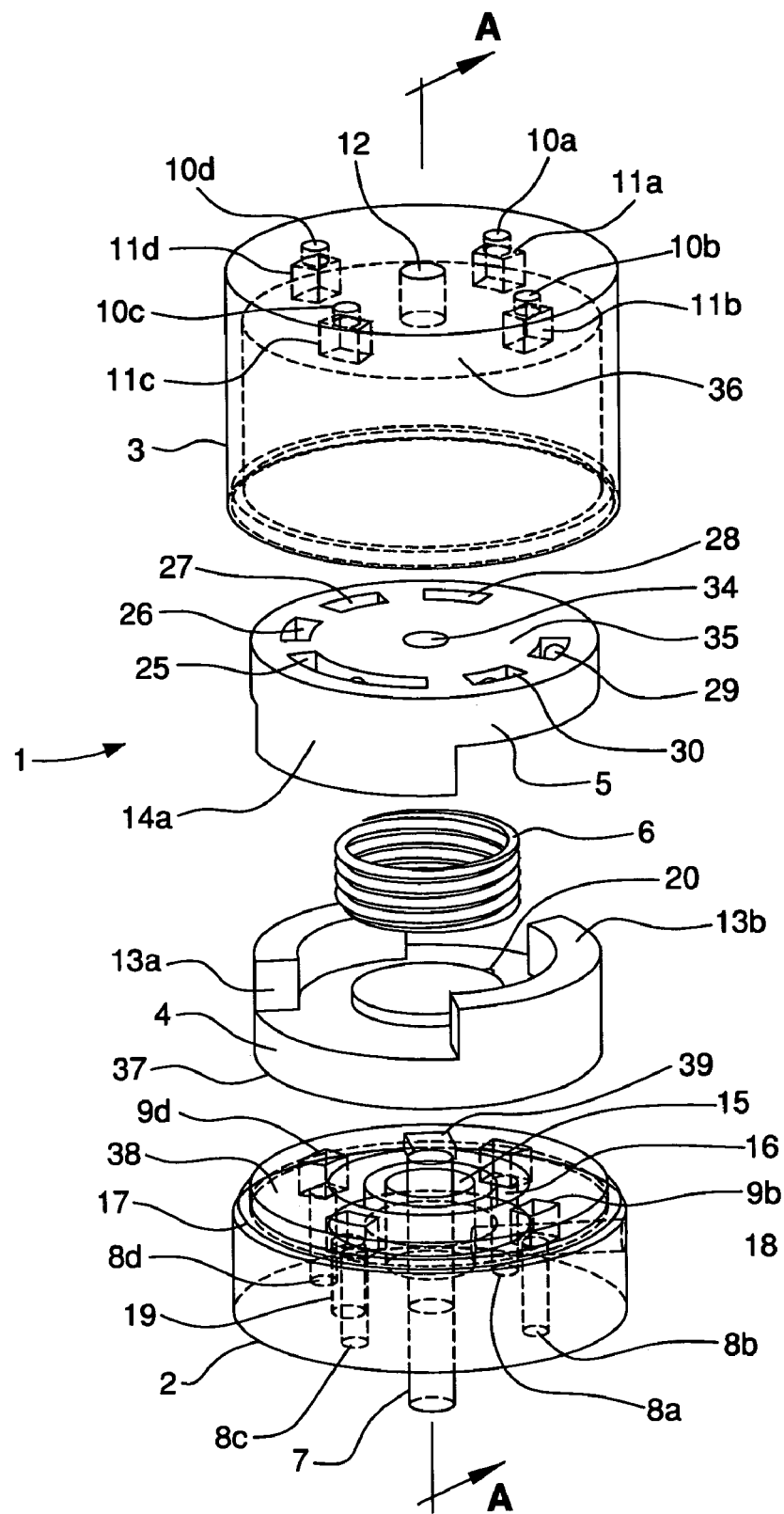
FIG. 1 is a perspective exploded view of a rotary valve according to an embodiment of the present invention.

The embodiments of the present invention address the operation of pressure swing adsorption (PSA) systems that utilize rotary valves and operate using cycles in which the lowest adsorber bed pressures are below atmospheric pressure. These cycles, are commonly referred to as vacuum swing adsorption (VSA) cycles and are utilized in VSA systems. The embodiments of the invention provide improved rotary valve designs that prevent contamination of the adsorbent by components in the atmosphere surrounding the rotary valve and the VSA system. The prior art for rotary valve PSA systems discloses methods of preventing valve leakage that causes product contamination, but does not consider the problem of adsorbent contamination addressed by the embodiments of the present invention for VSA systems.

A rotary valve is a valve with one or more stators, one or more rotors rotating within the valve in sealable sliding rotary motion with the stator(s), and multiple ports in the rotor(s) to form various gas flow paths between selected ports of the stator in a cyclic manner. The valve may be used in any process for directing fluids from one or more process sources to one or more process destinations in repeatable cyclic process steps.

A rotary valve with a planar circular configuration utilizes a flat ported rotor that rotates coaxially on a flat ported stator such that ports in the stator and rotor are aligned or blocked in a predetermined cyclic sequence. Sealing in this type of valve is provided by direct contact of the flat rotor face sliding over the flat stator face. A high degree of precision is required in the fabrication of these flat surfaces to prevent excessive leakage at the mating surfaces. Wear of the rotor and stator over time, dust or dirt particles that work their way into the rotor-stator interface, and distortions caused by temperature differentials may cause changes in the shape of the rotor and/or stator surfaces, thereby allowing leakage across the seal formed between the surfaces. If such leakage across the sealing interface occurs, gas from a rotary valve passage at a higher pressure can migrate into a passage at a lower pressure, thereby contaminating the gas in the lower pressure passage. If one or more of the passages is maintained under vacuum during the valve rotation, gas may leak from the surrounding atmosphere into the lower-pressure passage and contaminate the gas therein.

Rotary valves are particularly useful in pressure swing adsorption (PSA) systems utilizing multiple parallel adsorber beds operating in overlapping cyclic steps which include feed, pressure equalization, regeneration, and repressurization steps. Regeneration may include evacuation and purge steps at sub-atmospheric pressures, and adsorption systems operating at these conditions are typically described as vacuum swing adsorption (VSA) systems. Multiple ports in the stator connect feed gas and waste gas lines with the feed ends of a plurality of adsorber beds, connect the product ends of the beds with a product line, and connect the product ends of pairs of beds for pressure equalization. As the rotor rotates relative to the stator, the openings on the stator face register sequentially with openings in the rotor face to direct gas flow for the desired PSA process cycle steps.

In a VSA system for producing oxygen by the selective adsorption of nitrogen from air using zeolite adsorbents, for example, the pressure in each adsorber bed will be below atmospheric for part of the cycle. When a rotary valve is used in the VSA system, leakage of pressurized moist feed or atmospheric air from feed passages to equalization or purge passages in the valve can contaminate the product ends of the beds with water when the bed pressures are sub-atmospheric. Since the VSA system runs continuously, even small leaks of this type occurring over a period of weeks or months will allow the moisture in the feed air to accumulate in the product end of the adsorbent bed, thereby reducing its adsorptive capacity for nitrogen, which in turn reduces the VSA system performance.

This problem is addressed by the embodiments of the present invention in which the rotor is partially or totally enclosed by a sealed valve chamber having an interior volume contiguous with the outer periphery of each rotary valve seal. The sealed valve chamber is defined as and comprises an internal volume of any configuration that surrounds the periphery of each rotary valve seal and isolates each rotary valve seal from the external atmosphere surrounding the rotary valve and the sealed valve chamber assembly. The rotary valve is designed so that the pressure in the interior of the sealed valve chamber can be maintained at a pressure approximately equal to or less than the lowest pressure within any of the internal passages of the valve. This causes leaking gas within the valve to migrate into the sealed valve chamber rather than into lowest pressure passage in the valve. In a VSA system, this prevents leaking gas from migrating into the product end of an adsorber bed. This lowest pressure may be a sub-atmospheric pressure generated by a vacuum pump. The term "approximately equal to" means that the absolute pressure in the interior of the sealed valve chamber differs from the lowest pressure within the internal passages of the valve by no more than 10% of the difference between the highest and lowest pressures within the valve passages.

In the present disclosure, a vacuum passage is defined as any passage that is in flow communication with a sub-atmospheric pressure region. This sub-atmospheric pressure region may be generated by a vacuum pump or vacuum blower. A vacuum vent passage is defined as a passage at sub-atmospheric pressure that extends through any part of a rotary valve and is adapted to maintain the pressure within the sealed valve chamber at a subatmospheric pressure approximately equal to or less than the lowest pressure within the internal passages of the valve. The vacuum vent passage is in flow communication with the inlet of a vacuum pump.

The term "in flow communication with" as applied to a first and second region means that gas can flow from the first region to the second region through connecting piping and/or an intermediate region. The term "connected to" as applied to a first and second region means that gas can flow from the first region to the second region through connecting piping.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The stator or stators may be designed such that the sealed valve chamber is formed as an integral part of the rotary valve; alternatively, the sealed valve chamber may be a separate structure that partially or totally encloses the rotary valve. The sealed valve chamber may be utilized in various embodiments with different types of rotary valves as described in detail below.

In one embodiment, the rotary valve utilizes a single rotor rotatably sealed to a single stator in which the rotor has a flat rotor face with a plurality of openings and has at least one passage connecting at least one pair of the plurality of openings. The stator has a face in sealing contact with the rotor face to form a planar rotary valve seal having an outer periphery, and the stator face has a plurality of openings adapted to register sequentially with openings in the rotor face as the rotor rotates. Each opening in the stator face is connected to a respective passage through the stator, and at least one of the passages through the stator is a stator vacuum passage directly connected to a vacuum pump. Other passages through the stator may be connected to the feed and product ends of a group of adsorber beds to allow the flow of gas to, from, and between the beds as the rotary valve directs gas as required during the steps of the PSA or VSA process cycle. In this embodiment, the sealed valve chamber is formed by a chamber housing detachably sealed to the stator so that the outer periphery of the planar rotary valve seal is contiguous with the interior volume of the sealed valve chamber. The rotor is enclosed by the sealed valve chamber and a drive shaft for the rotor passes through a shaft seal assembly located in the chamber housing.

A vacuum vent passage may be connected to the sealed valve chamber by any of several methods. In one method, the vacuum vent passage passes through the stator and connects the interior volume of the sealed valve chamber with the stator vacuum passage. In another method, the vacuum vent passage is disposed in and passes through a wall in the chamber housing, and the vacuum vent passage is connected to the vacuum pump. In another method, the rotor has an arcuate vacuum groove that registers continuously with the stator vacuum passage, and the vacuum vent passage passes through the rotor and connects the arcuate vacuum groove with the interior volume of the sealed valve chamber.

In a second embodiment, the rotary valve utilizes two stators and two rotors forming two planar rotary valve seals, each having an outer periphery. A first rotor has a rotor face rotatable about an axis perpendicular to the rotor face, the rotor face has a plurality of openings, and the first rotor includes at least one passage connecting at least one pair of the plurality of openings. A first stator has a stator face in sealing contact with the rotor face of the first rotor to form a first planar rotary valve seal having an outer periphery. The stator face of the first stator has a plurality of openings adapted to register sequentially with openings in the rotor face of the first rotor as the first rotor rotates, and each opening in the stator face of the first stator is connected to a respective passage through the first stator.

A second rotor in this embodiment has a rotor face rotatable about an axis perpendicular to the rotor face, the rotor face of the second rotor has a plurality of openings, and the second rotor includes at least one passage connecting at least one pair of the plurality of openings. A second stator has a stator face in sealing contact with the rotor face of the second rotor to form a second planar rotary valve seal having an outer periphery, and the second stator face has a plurality of openings adapted to register sequentially with openings in the second rotor face as the second rotor rotates. Each opening in the stator face of the second stator is connected to a respective passage through the second stator, and the second rotor and second stator are disposed coaxially with the first rotor and first stator.

This embodiment includes a sealed valve chamber having an interior volume contiguous with the outer periphery of the first planar rotary valve seal and the outer periphery of the second planar rotary valve seal, and a vacuum vent passage is connected to the sealed valve chamber. Both rotors are located coaxially within the sealed valve chamber and are driven by a drive shaft that passes through a shaft seal assembly located in a wall of the sealed valve chamber or in one of the stators as described in more detail below. In this embodiment, the sealed valve chamber may be formed by an axial circumferential extension of the first stator that is detachably sealed to the second stator such that both rotors are located within the sealed valve chamber so formed. Alternatively, the sealed valve chamber may be formed by an axial circumferential extension of the second stator that is detachably sealed to the first stator such that both rotors are located within the sealed valve chamber so formed. Another version of the sealed valve chamber may be formed by axial circumferential extensions of both the first and second stators that are detachably sealed together to form the sealed valve chamber around both rotors. In all of these alternative configurations of the sealed valve chamber, the outer periphery of each planar rotary valve seal is contiguous with, i.e., is enclosed by, the interior of the sealed valve chamber.

The vacuum vent passage may be connected to the sealed valve chamber by any of several methods in this embodiment. In one method, at least one of the passages through the first stator is a stator vacuum passage directly connected to a vacuum pump, and the vacuum vent passage passes through the first stator and connects the interior volume of the sealed valve chamber with the stator vacuum passage in the first stator. In another method, the sealed valve chamber is enclosed in part by an outer wall and the vacuum vent passage is disposed in and passes through the outer wall, and the vacuum vent passage is connected to the vacuum pump. In another method, the first rotor has an arcuate vacuum groove that registers continuously with the stator vacuum passage, and the vacuum vent passage passes through the first rotor and connects the arcuate vacuum groove with the interior volume of the sealed valve chamber.

The sealed valve chamber may be applied to a rotary valve with any number of rotors enclosed by the sealed valve chamber. The sealed valve chamber may be integrated with the valve and formed by extensions of either or both of the stators as described above. Alternatively, the sealed valve chamber may be a separate structure or enclosure that surrounds the entire rotary valve wherein the lines to and from the rotary valve and the rotor drive shaft pass through the structure or enclosure with appropriate seals to isolate the valve chamber from the surrounding atmosphere.

Any of the above embodiments of the rotary valve described above may be utilized in a VSA system for the separation of gas mixtures using any desired number of multiple adsorber beds and operated in any desired VSA process cycle. The VSA process cycle includes at least the repeating sequential steps of feed/make product at a super-atmospheric pressure, evacuation to a sub-atmospheric pressure, and repressurization to super-atmospheric pressure. The embodiments may be used, for example, for the production of oxygen by VSA by the selective adsorption of nitrogen from air using zeolite adsorbents.

An exemplary embodiment of the invention is illustrated by the two-rotor, two-stator rotary valve of FIG. 1. This particular valve may be used in a VSA system for recovering oxygen from air utilizing four adsorbent beds and a VSA cycle in which each bed proceeds through the steps of (1) feed/make product, (2) feed/make product and provide product repressurization gas, (3) pressure equalization down, (4) provide purge, (5) evacuation, (6) receive purge, (7) pressure equalization up, and (8) receive product repressurization gas.

The main parts of rotary valve 1 of FIG. 1 are feed rotor 4, product rotor 5, both of which are disposed within a sealed valve chamber formed by feed housing member 2 and product housing member 3. The sealed valve chamber is formed by housings 2 and 3, which fit together and are sealed from the surrounding atmosphere by housing seal 17. Housings 2 and 3 are integral parts of the feed stator and product stator, respectively, and are indexed with features (not shown) so that the axes of corresponding bed feed end ports (i.e., 8a, 8b, 8c, and 8d) and bed product end ports (i.e., 10a, 10b, 10c, and 10b) are at the same radial location and are coaxially aligned with one another.

Feed rotor 4 and product rotor 5 are adapted to rotate coaxially within the sealed valve chamber formed by feed housing or stator 2, product housing or stator 3, and seal 17. Compression spring 6 is installed between the rotors, presses the feed rotor 4 against feed housing of stator 2, and presses product rotor 5 against product housing or stator 3.

Drive shaft 7 penetrates the sealed valve chamber axially through the center of feed housing or stator 2 and is driven by a motor (not shown) to turn the feed rotor 4 in a clockwise direction. A shaft seal (not shown) prevents leakage between the valve interior and the atmosphere through the clearance between the feed housing or stator 2 and shaft 7. Square end 39 or other non-circular feature on the end of the shaft transmits the rotational motion of the shaft to feed rotor 4.

Feed rotor 4 has drive lugs 13a and 13b that engage with mating lugs 14a and 14b (14b is not shown in this view) to transmit the rotary motion of feed rotor 4 to product rotor 5. The lugs not only transmit the motion, but also maintain rotational alignment between the rotors, so that as the ports in the feed housing or stator 2 are covered and uncovered by the rotor, the appropriate ports in the product housing or stator 3 are also covered or uncovered at the same time. The particular arrangement of lugs is not critical, and other methods of alignment and coaxial drive are possible such as, for example, pins or sockets. The alignment and drive system is adapted to transmit rotational movement from one rotor to the other, maintain angular alignment between the rotor parts, and allow the rotors to move axially with respect to one another so that they remain seated against the housings or stators. Spring 6 forces the rotors against the housings or stators so that feed rotor face 37 is pressed against stator face 38 and product rotor face 35 is pressed against face 36 of product housing or stator 3.

The operation of the valve now will be described with reference to an exemplary 4-bed VSA process using the eight steps of (1) feed/make product, (2) feed/make product and provide product repressurization gas, (3) pressure equalization down, (4) provide purge, (5) evacuation, (6) receive purge, (7) pressure equalization up, and (8) receive product repressurization gas.

The feed ends of the beds are connected to the feed housing or stator 2 and the product ends of the beds are connected to the product housing or stator 3. The feed and product ends of beds (not shown) are connected to corresponding ports on the valve, i.e., the feed ends of the beds are connected to ports 8a, 8b, 8c, and 8d and the corresponding product ends of the beds are connected to ports 10a, 10b, 10c, and 10d, respectively.

Figure 2:
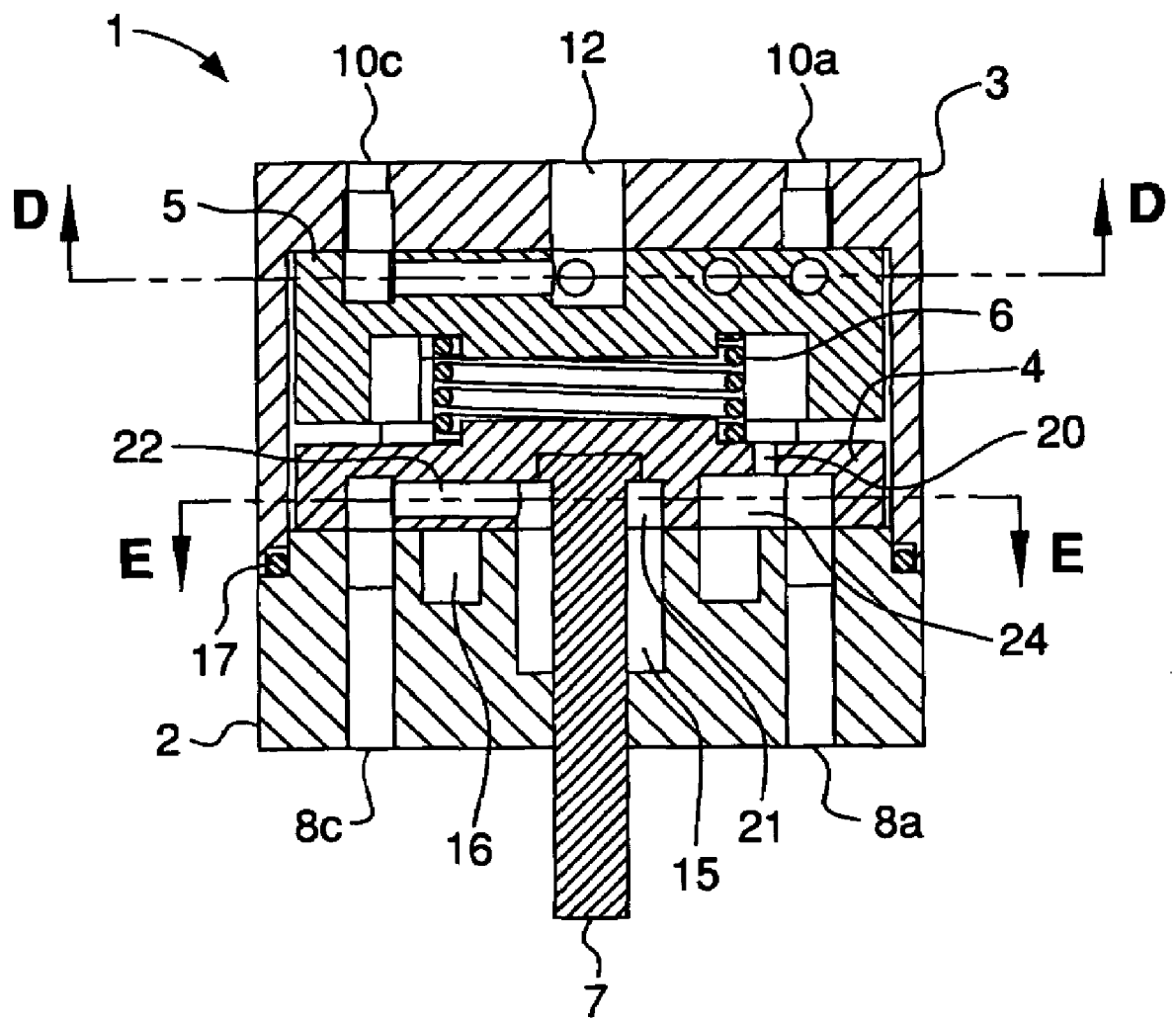
FIG. 2 is view of axial section A-A of the rotary valve of FIG. 1 in assembled form wherein the section intersects the axis and stator ports 8a and 8c.
Figure 3:
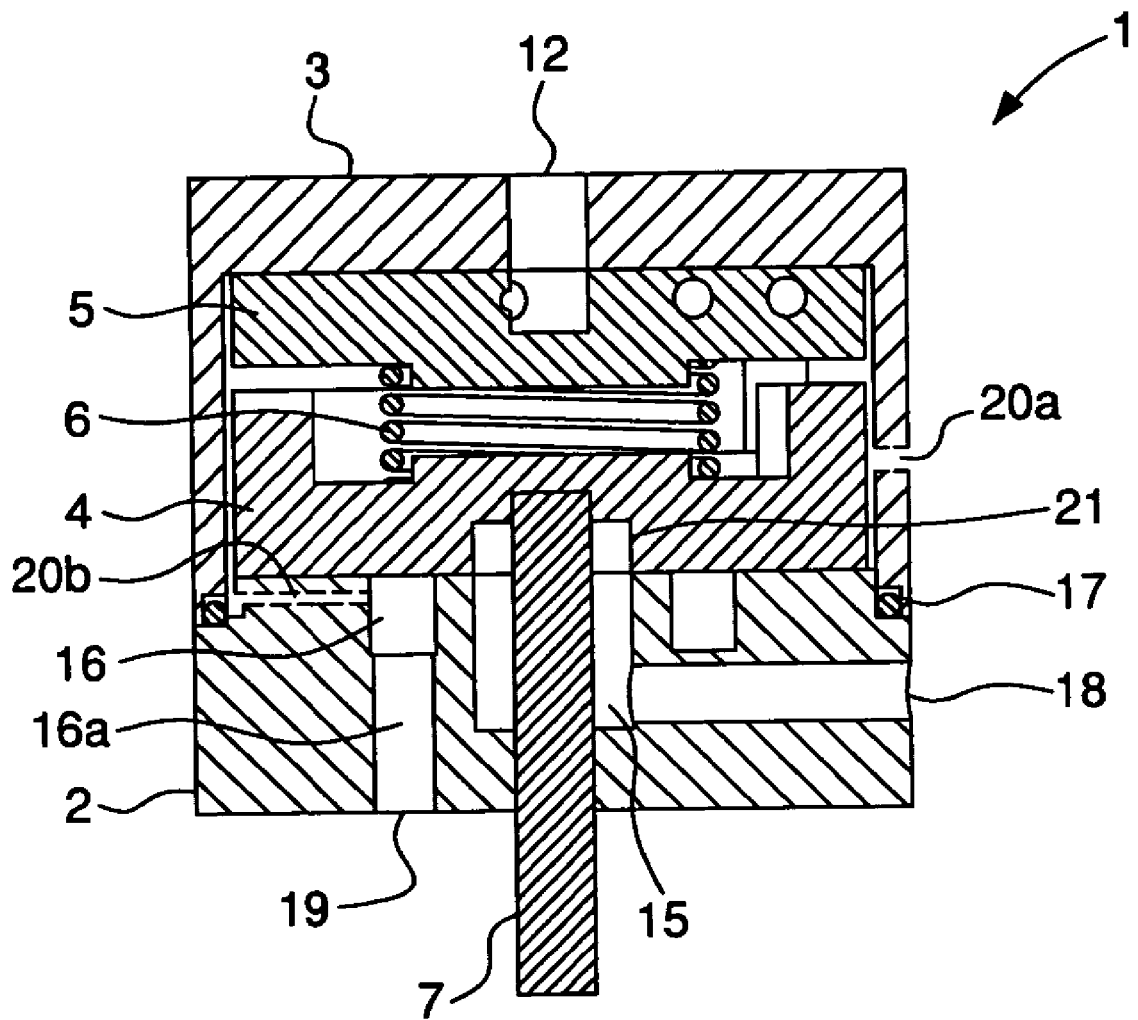
FIG. 3 is a view of an axial section of the rotary valve of FIG. 1 in assembled form wherein the section is in the plane of the drawing and intersects the axis and stator feed port 18.
Figure 4:
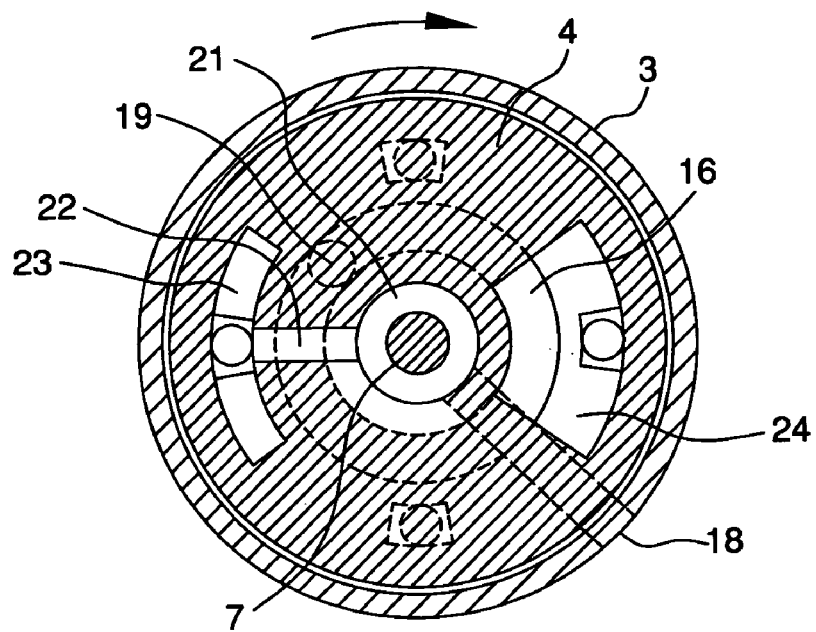
FIG. 4 is a view of a radial section of the rotary valve of FIG. 1 in assembled form as described by section E-E of FIG. 2 for a selected position of the feed rotor relative to the feed stator.
Figure 5:
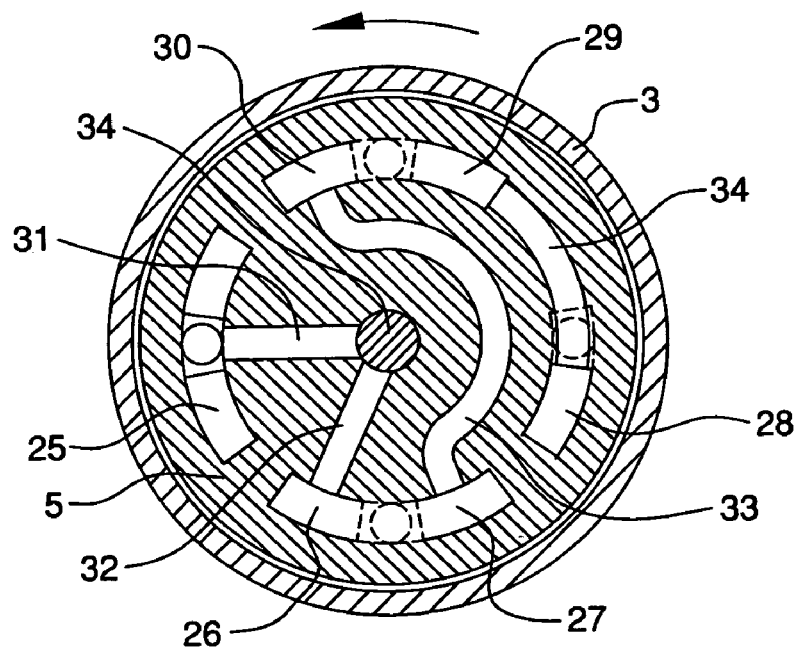
FIG. 5 is a view of a section of the rotary valve of FIG. 1 in assembled form as described by section D-D of FIG. 2 for a selected position of the product rotor relative to the product stator.

Referring to FIG. 3, air from a feed compressor is connected to feed port 18 that conducts the compressed air to a central cavity 15 in feed housing or stator 2. When feed rotor 4 is in one particular operating position, air from cavity 15 in the housing flows to central cavity 21 in rotor 4. Referring now to FIGS. 2 and 4, passage 22 in feed rotor 4 conducts the compressed air to arcuate slot 23 in feed rotor 4. If this slot is positioned over one of the ports 9a-9d in the feed housing or stator 2, the compressed air will flow through one of ports 9a-9d and a corresponding one of passages 8a-8d to the feed end of an adsorber bed.

In a similar manner, the suction port of a vacuum pump is directly connected to port 19 of feed housing or stator 2, and this port is connected to annular groove 16 in the feed housing. The stator vacuum passage formed by annular groove 16 and passage 16A leading to port 19 is directly connected to a vacuum pump, which means that the stator vacuum passage is not in fluid communication with the sealed valve chamber. Part of arcuate slot 24 in feed rotor 4 is always positioned over this groove. When arcuate slot 24 is also positioned over one of the ports 9a-9d in the feed housing or stator 2, the gas in the bed will flow through corresponding rotary valve connection 8a-8d, corresponding port 9a-9d, arcuate slot 24, annular passage 16, and finally port 19, from which the gas is exhausted by the vacuum pump.

The valve operation in an adsorption cycle will be explained by showing how each of the above steps is performed in two different valve positions. Referring to FIGS. 6A and 6B, in the VSA cycle described above, there is one bed in the feed/make product step (1), one bed in the pressure equalization down step (3), one bed in the evacuation step (5), and one bed in the pressure equalization up step (7). Each of these steps is explained in detail below.

When the valve is in the position shown in FIGS. 6A and 6B, the bed connected to valve ports 9c and 11c is in the feed/make product step. Compressed air flows from feed port 18 through valve port 9c to the feed end of the bed, as previously described. Concentrated oxygen product leaving the top of the bed flows into port 11c in the product housing or stator 3, from where it flows through arcuate slot 25, through passage 31, into central cavity 34, and out of port 12 in the product housing or stator 3 (FIGS. 1 and 2).

The beds connected to valve ports 9b and 11b and to ports 9d and 11d are undergoing the pressure equalization steps. The bed connected to ports 9b and 11b has just completed making product, so it is at high pressure. The bed connected to ports 9d and 11d has just completed the purge step, so it is at low pressure. The ports 9b and 9d in feed housing or stator 2 are not in registration with any slots in feed rotor 4, so there is no flow in or out of the feed ends of these beds. There is a connection between the tops of the beds, however. Gas may flow from the top of the higher pressure bed through port 11b, into arcuate slot 30, then through passage 33 in product rotor 5 to arcuate slot 27, and then into valve port 11d, from which it exits the valve into the lower pressure bed.

The bed connected to valve ports 9a and 11a is undergoing evacuation. Since valve port 11a is not in registration with any slots in product rotor 5, there is no flow in or out of the product end of this bed. However, the bed is connected at the feed end via port 9a to the vacuum pump through the flow path previously described.

FIGS. 7A and 7B show the valves at a later time, when the rotor has turned one-eighth of a turn from the positions of FIGS. 6A and 6B. In this position of FIGS. 7A and 7B, one bed is in the feed/make product and provide product repressurization gas step (2), one bed is in the receive product repressurization gas step (8), one bed is in the provide purge step (4), and another is in the receive purge step (6).

The bed connected to valve ports 9c and 11c is making product in the same manner as in FIGS. 6A and 6B, because there is still a flow path from feed port 18 to product outlet port 12. However, there is an additional flow path available from the product end of the bed. This occurs through passage 32 in product rotor 5, which allows product to flow from cavity 34, through passage 32, through arcuate slot 26, and out valve port 11d, from which it flows to the product end of a bed. The feed end of this bed, which is connected to the valve through port 9d, has no flow in or out, since port 9d is not in registration with either arcuate slot 23 or 24.

The beds connected to valve ports 9a and 11a and to ports 9b and 11b are receiving and providing purge, respectively. The bed connected to port 9b has no flow in or out at its feed end, but flow is possible from the product end port 11b. From this port, gas may flow through valve port 11b, arcuate slot 29, passage 34, and arcuate slot 28 into valve port 11a, which is connected to the product end of the bed receiving purge. In this way the provide purge step (4) takes place.

The bed connected to valve ports 9a and 11a is receiving purge at the product end as just described. At the feed end, purge gas may flow from the bed through port 9a, arcuate slot 24, annular groove 16, and out valve port 19 to the vacuum pump, thus providing flow for the purge step.

As the valve rotates, successive beds are subjected to the same process steps in a cyclical manner, so that at any time, one bed is making product, while other beds are in various stages of regeneration.

In the process just described, an adsorber bed is at a pressure less than atmospheric from the time just after the beginning of the evacuation step (5) until nearly the end of the equalization up step (7). If there is any leakage between the sub-atmospheric ports in the valve and the atmosphere surrounding the product rotor, gas from that atmosphere may be drawn into the product ends of the beds. For example, if the valve housing were not sealed and were open to the atmosphere, atmospheric air could be drawn into the product ends of the low pressure beds. Also, even if the valve were to be sealed, it is possible that feed air from the feed end of the valve (the highest pressure contained in the valve) could leak into the valve interior. This air could then be drawn into the product ends of the beds during the low-pressure portions of the cycle.

While it is possible that gas may leak from the super-atmospheric ports of the product valve to the sub-atmospheric ports, this is not damaging to the molecular sieve (zeolite) adsorbent in the beds, as this gas has already been dried by passing through the feed ends of the beds, which contains a water-selective adsorbent such as alumina. Methods of preventing this type of leakage have been disclosed in prior art as discussed above. While this type of leakage may be detrimental to the efficiency of the process, it will not degrade the adsorbent's capacity to adsorb the desired component, i.e., nitrogen.

The embodiments of the current invention address a more serious problem that occurs when the adsorbent in the product end of the bed comes into contact with humid atmospheric air. The adsorbent has a very strong affinity for water, so that once water contaminates the molecular sieve, it cannot be removed by the purge step of the process, and remains bound to the sieve, and inhibits adsorption of nitrogen. This problem has not been addressed in the prior art.

Since the adsorption system runs continuously, even a small leak over periods of weeks or months could eventually allow enough moisture into the beds to cause an unacceptable loss of capacity of the system. As described above, one solution to this problem is addressed by the embodiments of the invention in which an environment is created such that any valve leakage within the valve is removed before it can enter the product ends of the beds and damage the adsorbent. This may be accomplished by 1. sealing the valve chamber to make it air-tight, which is accomplished through the use of seal 17 and a shaft seal (not shown) that prevents pressurized feed air from leaking out along drive shaft 7, and
2. providing a small hole or vacuum vent passage to the interior of the sealed valve chamber.

In one embodiment, this is provided by vacuum vent passage 20 from arcuate vacuum slot 24 as shown in FIGS. 1 and 2. Alternatively, this may be provided by vacuum vent passage 20a in the wall of product housing or stator 3 as shown in FIG. 3. In another alternative, this may be provided by vacuum vent passage 20b in feed housing or stator 2 as shown in FIG. 3. When the valve is operating, any gases in the interior of the sealed valve chamber will flow toward the point of lowest pressure. In this process, that is always the suction of the vacuum pump.

By intentionally providing a flow path from the valve interior to the vacuum pump suction, any leakage of feed air from the feed rotor will be evacuated through the vacuum pump suction continuously before it can accumulate in the sealed valve chamber and contaminate the product ends of the beds as described above. Alternative passages to vacuum vent passages 20, 20a, and 20b described above may be possible and would have the same result of maintaining the desired low pressure within the sealed valve chamber.

While the above embodiment has been described for a 4-bed VSA air separation process with 8 cycle steps, the principle described may be used for VSA systems that separate any gas mixture with any number of beds and cycle steps to prevent contamination of the adsorbent by components present in the air surrounding rotary valve VSA systems. For example, a VSA system for separating a gas mixture other than air could use an adsorbent that can be contaminated by oxygen in the surrounding air; the rotary valves provided by the embodiments of the present invention can prevent this contamination.

A general embodiment of the invention thus includes a rotary valve having multiple bed connections (feed and product ends) as well as pressurized feed air and vacuum waste or exhaust connections. The body of the valve is sealed to be air-tight, and the sealed valve chamber is maintained at or near vacuum pump suction pressure. Sealing may be accomplished by using an O-ring, a gasket, or sealing compound at the joint between the valve housing parts. A flanged connection may be used if desired.

The valve may be used in a VSA gas separation process in which the ports are cyclically connected to adsorbent beds, a feed line, a product line, and a Waste discharge or evacuation line to effect an appropriate adsorption process cycle. The advantageous features described above, wherein (1) the peripheries of all rotary seals in the valve are enclosed within a sealed valve chamber and (2) the pressure in the interior volume of the buffer chamber is maintained at a value approximately equal to or less than the lowest pressure in any of the passages through the stator, may be applied to rotary valves having any number of rotors and stators. The valve may be used in any process for directing fluids from one or more process sources to one or more process destinations in repeatable cyclic process steps.

The invention claimed is:

1. A rotary valve comprising:
   (a) a rotor having a rotor face rotatable about an axis perpendicular to the rotor face, wherein the rotor face has a plurality of openings, and wherein the rotor includes at least one passage connecting at least one pair of the plurality of openings;
   (b) a stator having a stator face in sealing contact with the rotor face to form a planar rotary valve seal having an outer periphery, wherein the stator face has a plurality of openings in which at least two openings are adapted to register sequentially with openings in the rotor face as the rotor rotates, wherein each opening in the stator face is connected to a respective passage through the stator, and wherein at least one of the passages through the stator is a stator vacuum passage directly connected to a vacuum pump;
   (c) a sealed valve chamber having an interior volume contiguous with the outer periphery of the rotary valve seal, which chamber is sealed from the atmosphere surrounding the rotary valve; and
   (d) a vacuum vent passage connected to the sealed valve chamber.

2. The rotary valve of claim 1 wherein the vacuum vent passage is disposed in the stator and connects the interior volume of the sealed valve chamber with the stator vacuum passage.

3. The rotary valve of claim 1 wherein the sealed valve chamber is enclosed in part by an outer wall and the vacuum vent passage is disposed in and passes through the outer wall.

4. The rotary valve of claim 3 wherein the vacuum vent passage is connected to the vacuum pump.

5. The rotary valve of claim 1 wherein the rotor has an arcuate vacuum groove that registers continuously with the stator vacuum passage and wherein the vacuum vent passage is disposed in the rotor and connects the arcuate vacuum groove with the interior volume of the sealed valve chamber.

6. The rotary valve of claim 1 wherein the sealed valve chamber is formed in part by a portion of the stator adapted to surround the rotor.

7. The rotary valve of claim 1 further comprising
   (e) an additional rotor having a rotor face rotatable about an axis perpendicular to the rotor face, wherein the rotor face of the additional rotor has a plurality of openings, and wherein the additional rotor includes at least one passage connecting at least one pair of the plurality of openings; and
   (f) an additional stator having a stator face in sealing contact with the rotor face of (e) to form an additional planar rotary valve seal having an outer periphery, wherein the stator face has a plurality of openings in which at least two openings are adapted to register sequentially with openings in the rotor face of (e) as the additional rotor rotates, wherein each opening in the stator face is connected to a respective passage through the stator, and wherein the additional rotor and additional stator are disposed coaxially with the rotor of (a) and the stator of (b);
wherein the outer periphery of the additional planar rotary valve seal is contiguous with the sealed valve chamber.

8. The rotary valve of claim 6 wherein the vacuum vent passage is disposed in the stator of (b) and connects the interior volume of the sealed valve chamber with the stator vacuum passage of (b).

9. The rotary valve of claim 6 wherein the sealed valve chamber is enclosed in part by an outer wall and the vacuum vent passage is disposed in and passes through the outer wall.

10. The rotary valve of claim 8 wherein the vacuum vent passage is connected to the vacuum pump.

11. The rotary valve of claim 6 wherein the rotor of (a) has an arcuate vacuum groove that registers continuously with the stator vacuum passage and wherein the vacuum vent passage is disposed in the rotor and connects the arcuate vacuum groove with the interior volume of the sealed valve chamber.

12. The rotary valve of claim 6 wherein the sealed valve chamber is formed in part by an axial circumferential extension of the stator of (b), an axial circumferential extension of the additional stator of (f), or axial circumferential extensions of the stator of (b) and the additional stator of (f).

13. The rotary valve of claim 11 wherein the sealed valve chamber is formed by an axial circumferential extension of the stator of (b) extending axially around the rotor of (a) and the additional rotor of (e), and wherein the axial circumferential extension the stator of (b) is in sealable contact with the additional stator of (f).

14. The rotary valve of claim 11 wherein the sealed valve chamber is formed by an axial circumferential extension of the additional stator of (f) extending axially around the rotor of (a) and the additional rotor of (e), and wherein the axial circumferential extension of the additional stator of (f) is in sealable contact with the stator of (b).

15. The rotary valve of claim 1 further comprising a rotatable drive shaft adapted to drive the rotor.

16. The rotary valve of claim 15 wherein the drive shaft passes coaxially through the stator and is rotatably sealed by a shaft seal in contact with the shaft and the stator.

17. The rotary valve of claim 7 further comprising a rotatable drive shaft adapted to drive the rotor.

18. The rotary valve of claim 17 wherein the drive shaft passes coaxially through the stator of (b) and is rotatably sealed by a shaft in contact with the shaft and the stator of (b).

19. The rotary valve of claim 17 wherein the drive shaft passes coaxially through the additional stator of (f) and is rotatably sealed by a shaft seal in contact with the shaft and the stator of (f).

20. A rotary valve comprising:
   (a) a first rotor having a rotor face rotatable about an axis perpendicular to the rotor face, wherein the rotor face has a plurality of openings, and wherein the first rotor includes at least one passage connecting at least one pair of the plurality of openings;
   (b) a first stator having a stator face in sealing contact with the rotor face of the first rotor to form a first planar rotary valve seal having an outer periphery, wherein the stator face of the first stator has a plurality of openings in which at least two openings are adapted to register sequentially with openings in the rotor face of the first rotor as the first rotor rotates, wherein each opening in the stator face of the first stator is connected to a respective passage through the first stator;

(c) a second rotor having a rotor face rotatable about an axis perpendicular to the rotor face, wherein the rotor face of the second rotor has a plurality of openings, and wherein the second rotor includes at least one passage connecting at least one pair of the plurality of openings; and (d) a second stator having a stator face in sealing contact with the rotor face of the second rotor to form a second planar rotary valve seal having an outer periphery, wherein the second stator face has a plurality of openings in which at least two openings are adapted to register sequentially with openings in the second rotor face as the second rotor rotates, wherein each opening in the stator face of the second stator is connected to a respective passage through the second stator, and wherein the second rotor and second stator are disposed coaxially with the first rotor and first stator;

(e) a sealed valve chamber having an interior volume contiguous with the outer periphery of the first planar rotary valve seal and the outer periphery of the second planar rotary valve seal, which chamber is sealed from the atmosphere surrounding the rotary valve; and (f) a vacuum vent passage connected to the sealed valve chamber.

21. The rotary valve of claim 20 wherein at least one of the passages through the first stator is a stator vacuum passage directly connected to a vacuum pump and wherein the vacuum vent passage is disposed in the first stator and connects the interior volume of the sealed valve chamber with the stator vacuum passage in the first stator.

22. The rotary valve of claim 20 wherein the sealed valve chamber is enclosed in part by an outer wall and the vacuum vent passage is disposed in and passes through the outer wall.

23. The rotary valve of claim 22 wherein the vacumn vent passage is connected to the vacuum pump.

24. The rotary valve of claim 20 wherein the first rotor has an arcuate vacuum groove that registers continuously with a stator vacuum passage connected to a vacuum pump and wherein the vacuum vent passage is disposed in the first rotor and connects the arcuate vacuum groove with the interior volume of the sealed valve chamber.

25. The rotary valve of claim 24 wherein the sealed valve chamber is formed in part by an axial circumferential extension of the first stator, an axial circumferential extension of the second stator, or axial circumferential extensions of the first and second stators.

26. The rotary valve of claim 25 wherein the sealed valve chamber is formed by an axial circumferential extension of the first stator extending axially around the first and second rotors, and wherein the axial circumferential extension of the first stator is in sealable contact with the second stator.

27. The rotary valve of claim 25 wherein the sealed valve chamber is formed by an axial circumferential extension of the second stator extending axially around the first and second rotors, and wherein the axial circumferential extension of the second stator is in sealable contact with the first stator.

28. The rotary valve of claim 20 further comprising a rotatable drive shaft adapted to drive the first and second rotors.

29. The rotary valve of claim 28 wherein the drive shaft passes coaxially through the first stator and is rotatably sealed by a shaft seal in contact with the shaft and the first stator.

30. The rotary valve of claim 28 wherein the drive shaft passes coaxially through either the second stator and is rotatably sealed by a shaft sealed in contact with the shaft and the second stator.

31. A rotary valve comprising:

(a) a rotor having a rotor face rotatable about an axis perpendicular to the rotor face, wherein the rotor face has a plurality of openings, and wherein the rotor includes at least one passage connecting at least one pair of the plurality of openings;

(b) a stator having a stator face in sealing contact with the rotor face to form a planar rotary valve seal having an outer periphery, wherein the stator face has a plurality of openings in which at least two openings are adapted to register sequentially with openings in the rotor face as the rotor rotates, wherein each opening in the stator face is connected to a respective passage through the stator;

(c) a sealed valve chamber having an interior volume contiguous with the outer periphery of the rotary valve seal and a wall separating the interior volume from the ambient atmosphere; and (d) a vacuum vent passage connected to the sealed valve chamber;

wherein none of the passages through the stator discharges into the interior volume of the sealed valve chamber.

32. The rotary valve of claim 31 wherein the vacuum vent passage is disposed in and passes through the wall of the sealed valve chamber.

33. The rotary valve of claim 32 wherein the vacuum vent passage is connected to a vacuum pump.

34. The rotary valve of claim 31 wherein the rotor has an arcuate vacuum groove that registers continuously with a stator vacuum passage connected to a vacuum pump and wherein the vacuum vent passage is disposed in the rotor and connects the arcuate vacuum groove with the interior volume of the sealed valve chamber.

35. A method of operating a rotary valve comprising (a) providing a rotary valve comprising:

(1) a rotor having a rotor face rotatable about an axis perpendicular to the rotor face, wherein the rotor face has a plurality of openings, and wherein the rotor includes at least one passage connecting at least one pair of the plurality of openings;

(2) a stator having a stator face in sealing contact with the rotor face to form a planar rotary valve seal having an outer periphery, wherein the stator face has a plurality of openings in which at least two openings are adapted to register sequentially with openings in the rotor face as the rotor rotates, wherein each opening in the stator face is connected to a respective passage through the stator, and wherein at least one of the passages through the stator is a stator vacuum passage directly connected to a vacuum pump;

(3) a sealed valve chamber having an interior volume contiguous with the outer periphery of the rotary valve seal; and (4) a vacuum vent passage connected to the sealed valve chamber; and (b) rotating the rotor in sealing contact with the stator and maintaining the pressure in the interior volume of the sealed valve chamber at a value essentially equal to or less than the lowest pressure in any of the passages through the stator.

36. A method of operating a rotary valve comprising (a) providing rotary valve comprising (1) a first rotor having a rotor face rotatable about an axis perpendicular to the rotor face, wherein the rotor face has a plurality of openings, and wherein the first rotor includes at least one passage connecting at least one pair of the plurality of openings;

(2) a first stator having a stator face in sealing contact with the rotor face of the first rotor to form a first planar rotary valve seal having an outer periphery, wherein the stator-face of the first stator has a plurality of openings in which at least two openings are adapted to register sequentially with openings in the rotor face of the first rotor as the first rotor rotates, wherein each opening in the stator face of the first stator is connected to a respective passage through the first stator;

(3) a second rotor having a rotor face rotatable about an axis perpendicular to the rotor face, wherein the rotor face of the second rotor has a plurality of openings, and wherein the second rotor includes at least one passage connecting at least one pair of the plurality of openings; and (4) a second stator having a stator face in sealing contact with the rotor face of the second rotor to form a second planar rotary valve seal having an outer periphery, wherein the second stator face has a plurality of openings adapted to register sequentially with openings in the second rotor face as the second rotor rotates, wherein each opening in the stator face of the second stator is connected to a respective passage through the second stator, and wherein the second rotor and second stator are disposed coaxially with the first rotor and first stator;

(5) a sealed valve chamber having an interior volume contiguous with the outer periphery of the first planar rotary valve seal and the outer periphery of the second planar rotary valve seal; and (6) a vacuum vent passage connected to the sealed valve chamber; and (b) rotating the first and second rotors in sealing contact with the first and second stators, respectively, and maintaining the pressure in the interior volume of the sealed valve chamber at a value essentially equal to or less than the lowest pressure in any of the passages through the first stator and the second stator.

* * * * *

UNITED STATES PATENT AND TRADEMARK OFFICE
CERTIFICATE OF CORRECTION

PATENT NO. : 7,500,490 B2
APPLICATION NO. : 11/197859
DATED : March 10, 2009
INVENTOR(S) : Glenn Paul Wagner It is certified that error appears in the above-identified patent and that said Letters Patent is hereby corrected as shown below:

Column 16, Line 11

In claim 8 delete "6" and insert -- 7 --

Column 16, Line 15

In claim 9 delete "6" and insert -- 7 --

Column 16, Line 18

In claim 10 delete "8" and insert -- 9 --

Column 16, Line 20

In claim 11 delete "6" and insert -- 7 --

Column 16, Line 25

In claim 12 delete "6" and insert -- 7 --

Column 16, Line 30

In claim 13, delete "11" and insert -- 12 --

UNITED STATES PATENT AND TRADEMARK OFFICE
CERTIFICATE OF CORRECTION

PATENT NO. : 7,500,490 B2
APPLICATION NO. : 11/197859
DATED : March 10, 2009
INVENTOR(S) : Glenn Paul Wagner It is certified that error appears in the above-identified patent and that said Letters Patent is hereby corrected as shown below:

Column 16, Line 36

In claim 14 delete "11" and insert --12 --

Signed and Sealed this

Twelfth Day of May, 2009

JOHN DOLL
*Acting Director of the United States Patent and Trademark Office*